US007068935B1

(12) United States Patent
Dasylva et al.

(10) Patent No.: US 7,068,935 B1
(45) Date of Patent: Jun. 27, 2006

(54) TECHNIQUES FOR DILATING AND REVERSE DILATING OPTICAL CHANNELS IN AN OPTICAL SYSTEM

(75) Inventors: Abel C. Dasylva, Ottawa (CA); Delfin Y. Montuno, Kanata (CA)

(73) Assignee: Nortel Networks Limited, Quebec (CA)

( * ) Notice: Subject to any disclaimer, the term of this patent is extended or adjusted under 35 U.S.C. 154(b) by 681 days.

(21) Appl. No.: 10/195,531

(22) Filed: Jul. 16, 2002

(51) Int. Cl.
*H04J 14/00* (2006.01)

(52) U.S. Cl. .............................. 398/49; 398/48; 398/45

(58) Field of Classification Search .................... 398/1, 398/48, 49, 50
See application file for complete search history.

(56) References Cited

U.S. PATENT DOCUMENTS 6,097,517 A * 8/2000 Okayama ........................ 398/1

OTHER PUBLICATIONS

Jacob Sharony et al, "The Wavelength Dilation Concept in Lightwave Networks—Implementation and System Considerations", Journal of Lightwave Technology, IEEE, vol. 11, No. 5/6, May/Jun. 1993, pp. 900-907.*

N. Antoniades, et al., An Architecture for a Wavelength-Interchanging Cross-Connect Utilizing Parametric Wavelength Converters, *Journal of Lightwave Technology*, vol. 17, No. 7, Jul. 1999, pp. 1113-1132.
Jacob Sharony, et al., The Wavelength Dilation Concept In Lightwave Networks—Implementation and System Considerations,*Journal of Lightwave Technology*, vol. 11, No. 5/6, May/Jun. 1993, pp. 900-907.
S. J. B. Yoo, Wavelength Conversion Technologies for WDM Network Applications, *Journal of Lightwave Technology*, vol. 14, No. 6, Jun. 1996, pp. 955-966.

* cited by examiner

Primary Examiner—David C. Payne
(74) Attorney, Agent, or Firm—Hunton & Williams LLP

(57) ABSTRACT

Techniques for dilating and reverse dilating optical channels in an optical system are disclosed. In one particular exemplary embodiment, a technique for dilating optical channels may be realized as a method for dilating optical channels in a system having W optical frequencies. The method comprises receiving a plurality of optical channels each operating at a respective one of the W optical frequencies. The method also comprises converting the optical frequency of each of the plurality of optical channels into a respective converted optical frequency defined by $\Delta+\delta.f$, wherein f represents the optical frequency of each of the plurality of optical channels, and wherein $\delta=\pm 1$ and $\Delta$ are constant for all of the plurality of optical channels. The method further comprises directing each of the plurality of optical channels based at least in part upon the respective converted optical frequency of each of the plurality of optical channels.

20 Claims, 16 Drawing Sheets

TECHNIQUES FOR DILATING AND REVERSE DILATING OPTICAL CHANNELS IN AN OPTICAL SYSTEM

FIELD OF THE INVENTION

The present invention relates generally to optical channel switching and, more particularly, to techniques for dilating and reverse dilating optical channels in an optical system.

BACKGROUND OF THE INVENTION

All-optical wavelength division multiplexing (WDM) networks comprise fiber links and all-optical cross-connects to route light paths in the optical domain. All-optical cross-connects are also referred to as photonic cross-connects. They are of different kinds according to their architecture, their components, and their capabilities. After optical space switches, wavelength-selective cross-connects form the next simplest class of optical cross-connects. They are built with wavelength filtering and space switching elements. These elements are often organized in parallel switching planes, where each plane is dedicated to switching channels with a given wavelength.

Referring to FIG. 1, there is shown a wavelength-selective optical cross-connect 10 comprising a plurality of optical demultiplexers 12, a plurality of space switches 14, and a plurality of optical multiplexers 16. In any of the plurality of space switches 14, the crossing of channels with the same frequency produces in-band cross-talk, which is quite detrimental to signal quality.

To minimize in-band cross-talk, wavelength-selective cross-connects are wavelength-dilated. That is, they are instead organized as parallel planes of space switches, where each plane is assigned a set of channels with distinct frequencies sufficiently far apart. Wavelength-dilation ensures that no two channels with identical or close frequencies share the same space switch. Referring to FIG. 2, there is shown a wavelength-dilated wavelength-selective optical cross-connect 20 comprising a plurality of optical demultiplexers 22, a plurality of space switches 24, and a plurality of optical multiplexers 26.

Wavelength-interchanging cross-connects are capable of wavelength conversion. Because of the importance of wavelength conversion, wavelength-interchanging cross-connects form an important class of wavelength-switching optical cross-connects. Wavelength-interchanging cross-connects are built with space switches, wavelength filters, optical amplifiers, and frequency converters based on non-linear optical elements. Some frequency converters are based on wave-mixing, where one or several signals at distinct carrier frequencies mix with a high power pump wave and are frequency-shifted. With wave-mixing, an input signal at frequency f is shifted to frequency $(n-1)f^p-f$, wherein $n=2,3$ is the order of the wave-mixing process, and $f^p$ is the frequency of the pump wave. A constant number of connected wave-mixing devices provide other forms of wave-mixing frequency conversions, such as wave-mixing frequency translations, where an incoming signal at frequency f is shifted to frequency $\Delta+f$, and $\Delta$ is a frequency-independent frequency shift. Frequency converters based on wave-mixing can simultaneously process several input signals at distinct frequencies, due to the unique property of bulk frequency conversion. In wavelength-switching cross-connects, wave-mixing devices may also find other uses apart from wavelength conversion, such as chromatic dispersion compensation through phase conjugation, or ultra broadband optical parametric amplification.

Wavelength-switching cross-connects including space switches, wavelength filters, and wave-mixing devices are called wave-mixing cross-connects. Wave-mixing wavelength-interchanging cross-connects are a special class of wavelength-interchanging cross-connects providing wavelength conversion through wave-mixing. Wave-mixing wavelength-interchanging cross-connects are also called parametric wavelength-interchanging cross-connects. Through the bulk frequency conversion property, wave-mixing wavelength-interchanging cross-connects could provide wavelength conversion with a reduced number of converters, compared to previous designs based on dedicated converters. In wave-mixing wavelength-interchanging cross-connects, a large number of channels may share a given wave-mixing frequency converter. However, to avoid in-band cross-talk, no two channels with the same frequency can share the same wave-mixing device.

In all-optical wavelength-switching networks, transmission impairments severely limit the fiber bandwidth available to the C and S bands, both covering a few tens of nanometers. However, in optical cross-connects, there are fewer impairments with technologies such as free space optics. For this reason, optical switching bandwidths may exceed the optical transmission capacity by many orders of magnitude (i.e. a bandwidth mismatch may occur between the transmission and switching capacities). A similar effect occurs with electronic packet switching, where it is possible to design routers running at rates well above line rates. In the electronic domain, this bandwidth mismatch is called speedup and is used to facilitate packet switching. However, in the optical domain, this bandwidth mismatch has yet to be utilized to analogously facilitate photonic wavelength-switching.

In view of the foregoing, it would be desirable to utilize the bandwidth mismatch that occurs between the transmission and switching capacities in an optical system so as to facilitate photonic wavelength-switching.

SUMMARY OF THE INVENTION

According to the present invention, techniques for dilating and reverse dilating optical channels in an optical system are provided. In one particular exemplary embodiment, the technique for dilating optical channels may be realized as a method for dilating optical channels in a system having W optical frequencies. The method comprises receiving a plurality of optical channels each operating at a respective one of the W optical frequencies. The method also comprises converting the optical frequency of each of the plurality of optical channels into a respective converted optical frequency defined by $\Delta+\delta.f$, wherein f represents the optical frequency of each of the plurality of optical channels, and wherein $\delta=\pm 1$ and $\Delta$ are constant for all of the plurality of optical channels. The method further comprises directing each of the plurality of optical channels based at least in part upon the respective converted optical frequency of each of the plurality of optical channels.

In accordance with other aspects of this particular exemplary embodiment of the present invention, the respective converted optical frequency of each of the plurality of optical channels may beneficially be one of the W optical frequencies.

In accordance with further aspects of this particular exemplary embodiment of the present invention, the plurality of optical channels may beneficially be received by receiving a multiplexed optical signal including the plurality of optical channels. If such is the case, the method may further beneficially comprise demultiplexing the multiplexed optical signal into each of the plurality of optical channels according to the respective converted optical frequency of each of the plurality of optical channels. The method may then still further beneficially comprise multiplexing each of the plurality of directed optical channels into a respective multiplexed optical signal having W×D optical channels, wherein D≧1. There may then beneficially be a total of F/D multiplexed optical signals each having W×D optical channels, wherein F represents a number of space-divisions within the system.

In another particular exemplary embodiment, the technique for dilating optical channels may be realized as an apparatus for dilating optical channels in a system having W optical frequencies. The apparatus comprises a converter for receiving a plurality of optical channels each operating at a respective one of the W optical frequencies, and for converting the optical frequency of each of the plurality of optical channels into a respective converted optical frequency defined by $\Delta+\delta.f$, wherein f represents the optical frequency of each of the plurality of optical channels, and wherein $\delta=\pm 1$ and $\Delta$ are constant for all of the plurality of optical channels. The apparatus also comprises a routing device for directing each of the plurality of optical channels based at least in part upon the respective converted optical frequency of each of the plurality of optical channels.

In accordance with other aspects of this particular exemplary embodiment of the present invention, the respective converted optical frequency of each of the plurality of optical channels may beneficially be one of the W optical frequencies.

In accordance with further aspects of this particular exemplary embodiment of the present invention, the converter may beneficially receive the plurality of optical channels by receiving a multiplexed optical signal including the plurality of optical channels. If such is the case, the apparatus may further beneficially comprise a demultiplexer for demultiplexing the multiplexed optical signal into each of the plurality of optical channels according to the respective converted optical frequency of each of the plurality of optical channels. The apparatus may then still further beneficially comprise a multiplexer for multiplexing each of the plurality of directed optical channels into a respective multiplexed optical signal having W×D optical channels, wherein D≧1. There may then beneficially be a total of F/D multiplexed optical signals each having W×D optical channels, wherein F represents a number of space-divisions within the system.

In still another particular exemplary embodiment, the technique for dilating optical channels may be realized as a method for reverse dilating optical channels in a system having W optical frequencies. The method comprises receiving a plurality of optical channels each operating at a respective one of the W optical frequencies. The method also comprises directing each of the plurality of optical channels based at least in part upon the respective optical frequency of each of the plurality of optical channels. The method further comprises converting the optical frequency of each of the plurality of directed optical channels into a respective converted optical frequency defined by $\Delta+\delta.f$, wherein f represents the optical frequency of each of the plurality of directed optical channels, and wherein $\delta=\pm 1$ and $\Delta$ are constant for all of the plurality of directed optical channels.

In accordance with other aspects of this particular exemplary embodiment of the present invention, the respective converted optical frequency of each of the plurality of directed optical channels may beneficially be one of the W optical frequencies.

In accordance with further aspects of this particular exemplary embodiment of the present invention, the plurality of optical channels may beneficially be received by receiving a multiplexed optical signal including the plurality of optical channels. If such is the case, the method may further beneficially comprise demultiplexing the multiplexed optical signal into each of the plurality of optical channels according to the respective optical frequency of each of the plurality of optical channels. The method may then still further beneficially comprise multiplexing each of the plurality of directed optical channels into a respective multiplexed optical signal having W×D optical channels, wherein D<1. There may then beneficially be a total of F/D multiplexed optical signals each having W×D optical channels, wherein F represents a number of space-divisions within the system.

In yet another particular exemplary embodiment, the technique for dilating optical channels may be realized as an apparatus for reverse dilating optical channels in a system having W optical frequencies. The apparatus comprises a routing device for receiving a plurality of optical channels each operating at a respective one of the W optical frequencies, and for directing each of the plurality of optical channels based at least in part upon the respective optical frequency of each of the plurality of optical channels. The apparatus also comprises a converter for converting the optical frequency of each of the plurality of directed optical channels into a respective converted optical frequency defined by $\Delta+\delta.f$, wherein f represents the optical frequency of each of the plurality of directed optical channels, and wherein $\delta=\pm 1$ and $\Delta$ are constant for all of the plurality of directed optical channels.

In accordance with other aspects of this particular exemplary embodiment of the present invention, the respective converted optical frequency of each of the plurality of directed optical channels may beneficially be one of the W optical frequencies.

In accordance with further aspects of this particular exemplary embodiment of the present invention, the routing device may beneficially receive the plurality of optical channels by receiving a multiplexed optical signal including the plurality of optical channels. If such is the case, the apparatus may further beneficially comprise a demultiplexer for demultiplexing the multiplexed optical signal into each of the plurality of optical channels according to the respective optical frequency of each of the plurality of optical channels. The apparatus may then still further beneficially comprise a multiplexer for multiplexing each of the plurality of directed optical channels into a respective multiplexed optical signal having W×D optical channels, wherein D<1. There may then beneficially be a total of F/D multiplexed optical signals each having W×D optical channels, wherein F represents a number of space-divisions within the system.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
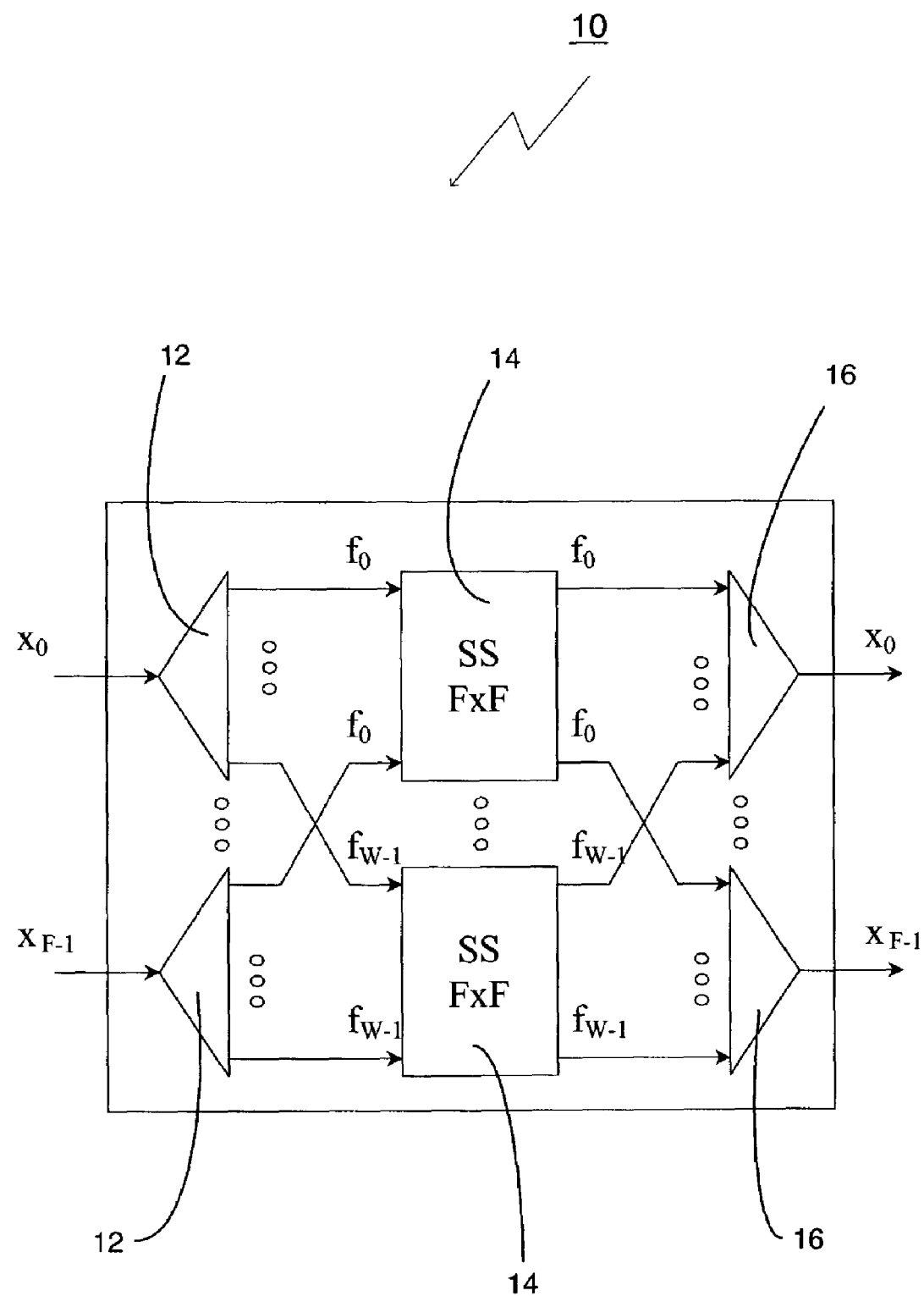
FIG. 1 shows a traditional wavelength-selective optical cross-connect.
Figure 2:
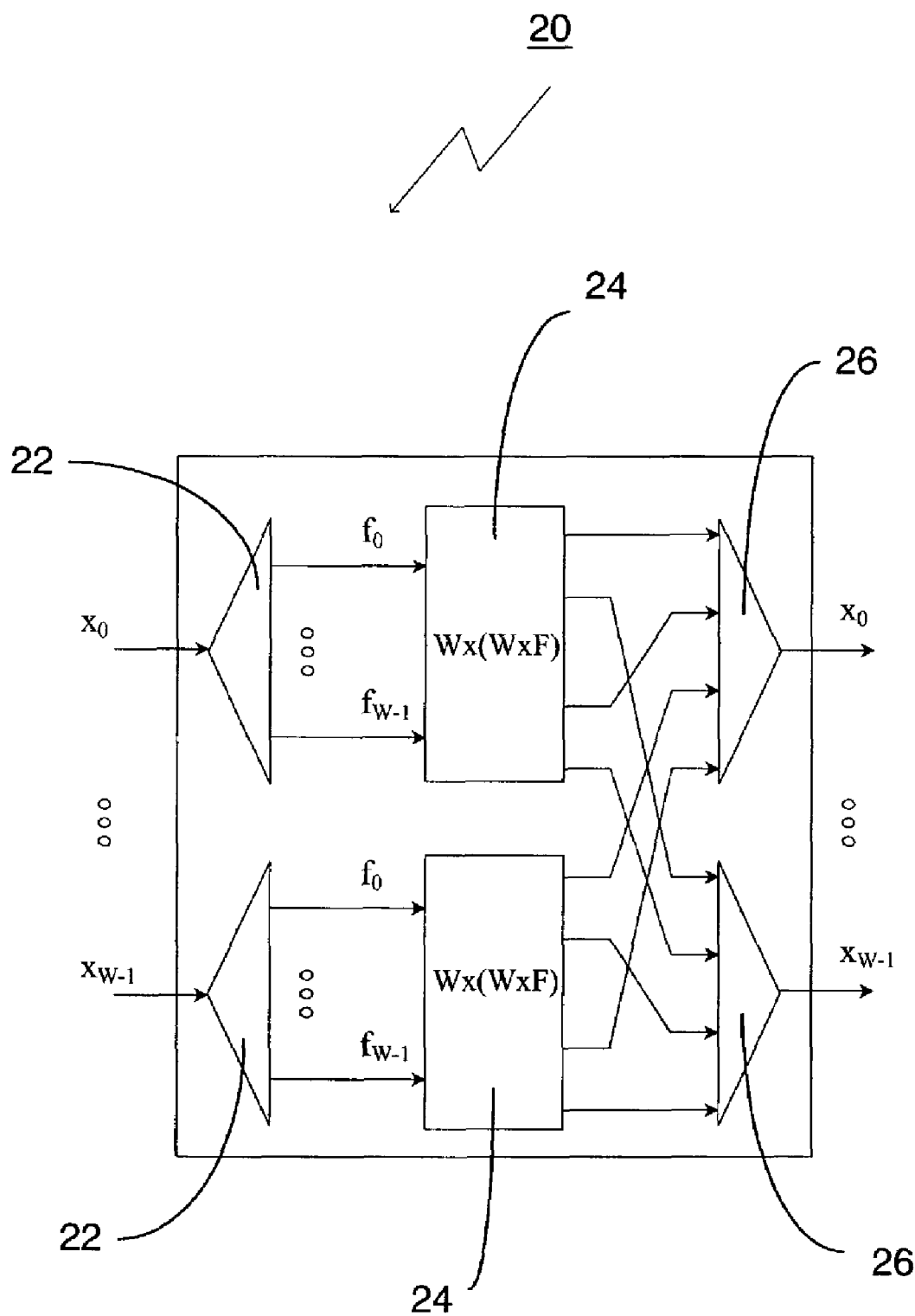
FIG. 2 shows a traditional wavelength-dilated wavelength-selective optical cross-connect.

Wavelength conversion is an important feature in all-optical WDM networks, as it increases network utilization and reduces the complexity of optical bandwidth management. In large scale networks, wavelength conversion is still an expensive feature to provide. However, new wave-mixing wavelength-interchanging cross-connects promise to offer all-optical wavelength conversion with few converters. Wave-mixing cross-connects comprise space switches, wavelength filters, optical amplifiers, and wave-mixing elements.

Wave-mixing is a fully coherent process enabling bulk frequency conversion. For example, in a wave-mixing device, a signal at frequency f is converted to frequency $(n-1)f^p - f$, wherein n=2,3 is the order of the wave-mixing process, and $f^p$ is the frequency of a high-power pump wave. When n=2, the wave-mixing process is called a three-wave-mixing or difference frequency generation process. When n=3, the wave-mixing process is called a four-wave-mixing process.

Without regard for power limitations, a given wave-mixing frequency converter can in principle simultaneously convert a large number of channels at distinct frequencies, up to the number of channels in the spectrum. Also, wave-mixing processes have large bandwidths in the terahertz range. They can convert the whole fiber spectrum with little impact on the information bearing capacity of individual channels. In wave-mixing wavelength-interchanging cross-connects, a large number of channels on the order of the number of wavelengths in the system can share the same wave-mixing frequency converter, resulting in reduced converter requirements. For a fixed number of channels, frequency converters are likely to be minimized when channels are distributed among the largest number of distinct wavelength channels. Thus, the present invention provides a technique of cross-fiber wavelength-dilation and its scalable implementations using wave-mixing, where the number of wavelength-divisions are temporarily increased for the same number of channels in order to facilitate wave-mixing wavelength conversion.

The general principle of cross-fiber wavelength-dilation is to map channels from distinct fibers, with frequencies in a common frequency set, to channels in a common space-division, with frequencies in disjoint frequency sets. A cross-fiber wavelength-dilation can be qualified as block or interleaved. With block cross-fiber wavelength-dilation schemes, channels from different fibers are mapped to disjoint frequency sets, such that channels from the same fibers are mapped to a common space-division and occupy contiguous frequencies. With interleaved cross-fiber wavelength-dilation schemes, channels from different fibers are mapped to disjoint frequency sets, in a common space-division, such that channels from the same fibers are interleaved with channels from distinct fibers.

A cross-fiber wavelength-dilation scheme can also qualify as wave-mixing or arbitrary. In the wave-mixing case, a channel with frequency f on a given space-division is mapped to a channel with frequency $\Delta + \delta.f$ on a dilated space-division, wherein $\delta = \pm 1$ and $\Delta$ are constant for all channels from the same fiber. Wave-mixing solutions form an important class of dilation schemes as they can be implemented with O(1) wave-mixing converters per fiber, and the same converters can also provide pre- and post-line amplification.

As previously mentioned, the general principle of cross-fiber wavelength-dilation is to map channels from distinct fibers, with frequencies in a common frequency set, to channels in a common space-division, with frequencies in disjoint frequency sets. A wavelength-dilated channel is the image of a channel mapped through a wavelength-dilation operation. A wavelength-dilated space-division is defined as a set of channels belonging to a common space-division after a wavelength-dilation operation. A wavelength-dilated WDM spectrum refers to a set of distinct frequencies found in different wavelength-dilated space-divisions after a wavelength-dilation operation.

There are different types of wavelength-dilation operations according to the relative position of wavelength-dilated channels from different fibers, and to the type of frequency conversion applied during the wavelength-dilation operation. For cross-fiber wavelength-dilation, a wavelength-dilation factor may be used. The wavelength-dilation factor is defined as the ratio between the numbers of wavelengths in the spectrum after and before a wavelength-dilation operation. It is equivalently defined as the ratio between the numbers of fibers or space-divisions before and after a wavelength-dilation operation. By definition, the wavelength-dilation factor is always larger than 1.

In addition to cross-fiber wavelength-dilation, the present invention also provides a technique for reverse cross-fiber wavelength-dilation. Reverse cross-fiber wavelength-dilation is generally defined as the mapping of channels from a common fiber, with frequencies in disjoint frequency sets, to channels on distinct fibers, with frequencies in a common frequency set. For each cross-fiber wavelength-dilation there is a corresponding unique reverse cross-fiber wavelength-dilation, such that the composition of the two mappings in this order leaves the distribution of channels among fibers and wavelengths unchanged. Analogous with cross-fiber wavelength-dilation, a reverse wavelength-dilated channel is the image of a channel mapped through a reverse wavelength-dilation operation. A reverse wavelength-dilated space-division is a set of channels mapped to a common space-division after a reverse wavelength-dilation operation. A reverse wavelength-dilated spectrum refers to a set of distinct wavelengths found in different space-divisions after a reverse wavelength-dilation operation.

Similar to cross-fiber wavelength-dilation operations, reverse cross-fiber wavelength-dilation operations differ according to the distribution of mapped channels from the same space-division to different reverse wavelength-dilated space-divisions, and to the type of wavelength conversion applied during the reverse wavelength-dilation operation. For reverse cross-fiber wavelength-dilation, a reverse wavelength-dilation factor may be used. The reverse wavelength-dilation factor is defined as the ratio between the numbers of wavelengths in the spectrum after and before a reverse wavelength-dilation operation. By definition, a reverse wavelength-dilation factor is always smaller than 1.

Cross-fiber wavelength-dilation and reverse cross-fiber wavelength-dilation schemes serve to map channels back and forth between space- and wavelengths-divisions in optical cross-connects. Through this mapping it is possible to leverage the optical speedup capability of high-bandwidth cross-connects, and to facilitate certain switching operations such as wavelength-conversion. Cross-fiber wavelength-dilation and reverse cross-fiber wavelength-dilation are preferably provided by adaptation modules respectively placed at the inputs and at the outputs of a given wavelength-switching cross-connect. These modules may include, for example, wavelength routers, frequency converters, and other components.

Figure 3:
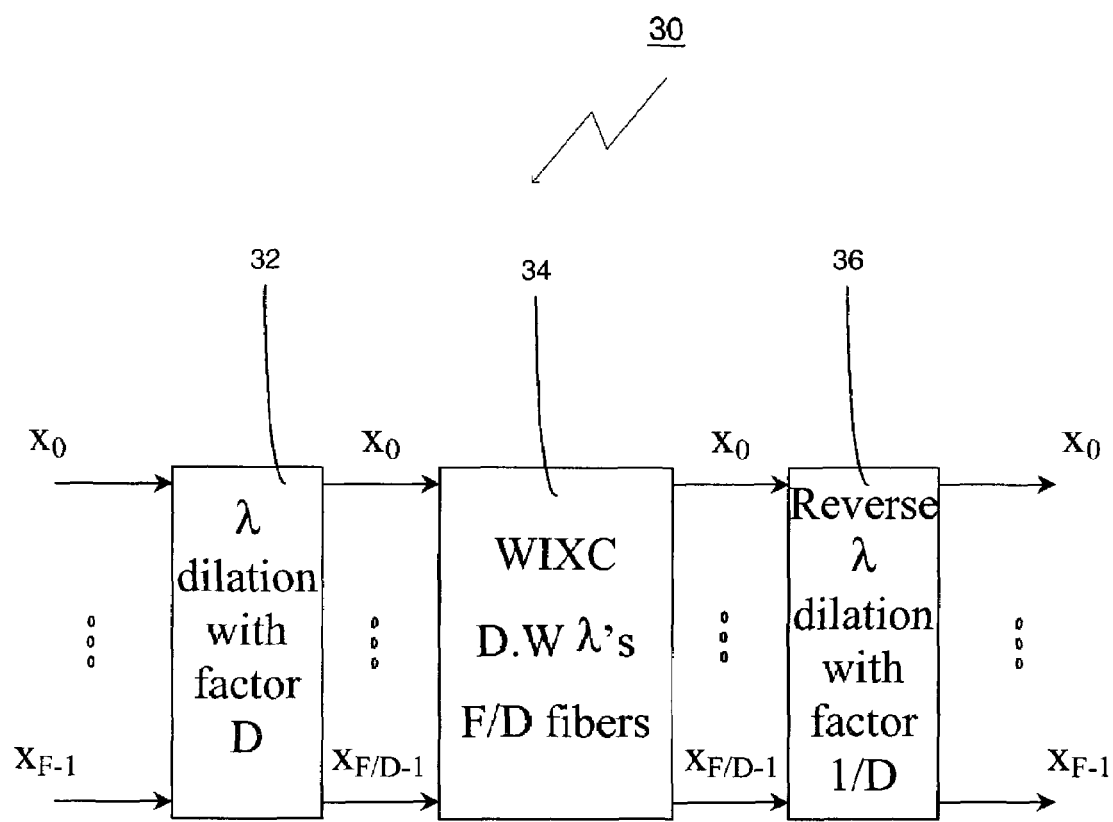
FIG. 3 shows a generic cross-fiber wavelength-dilated photonic cross-connect in accordance with the present invention.

Referring to FIG. 3, there is shown a generic cross-fiber wavelength-dilated photonic cross-connect 30 comprising an input wavelength-dilation module 32, a central wavelength-interchanging cross-connect 34, and an output reverse wavelength-dilation module 36 in accordance with the present invention. Assuming F fibers or space-divisions, W wavelength-divisions per fiber, and a WDM spectrum including a set of regularly spaced frequencies of the form $f_i = f_0 + i \cdot \Delta f$, wherein $i=0, \ldots, W-1$, the central wavelength-interchanging cross-connect 34 has F/D space-divisions and W.D wavelength-divisions, wherein D is the cross-fiber wavelength-dilation factor and 1/D is the reverse cross-fiber wavelength-dilation factor.

Figure 4:
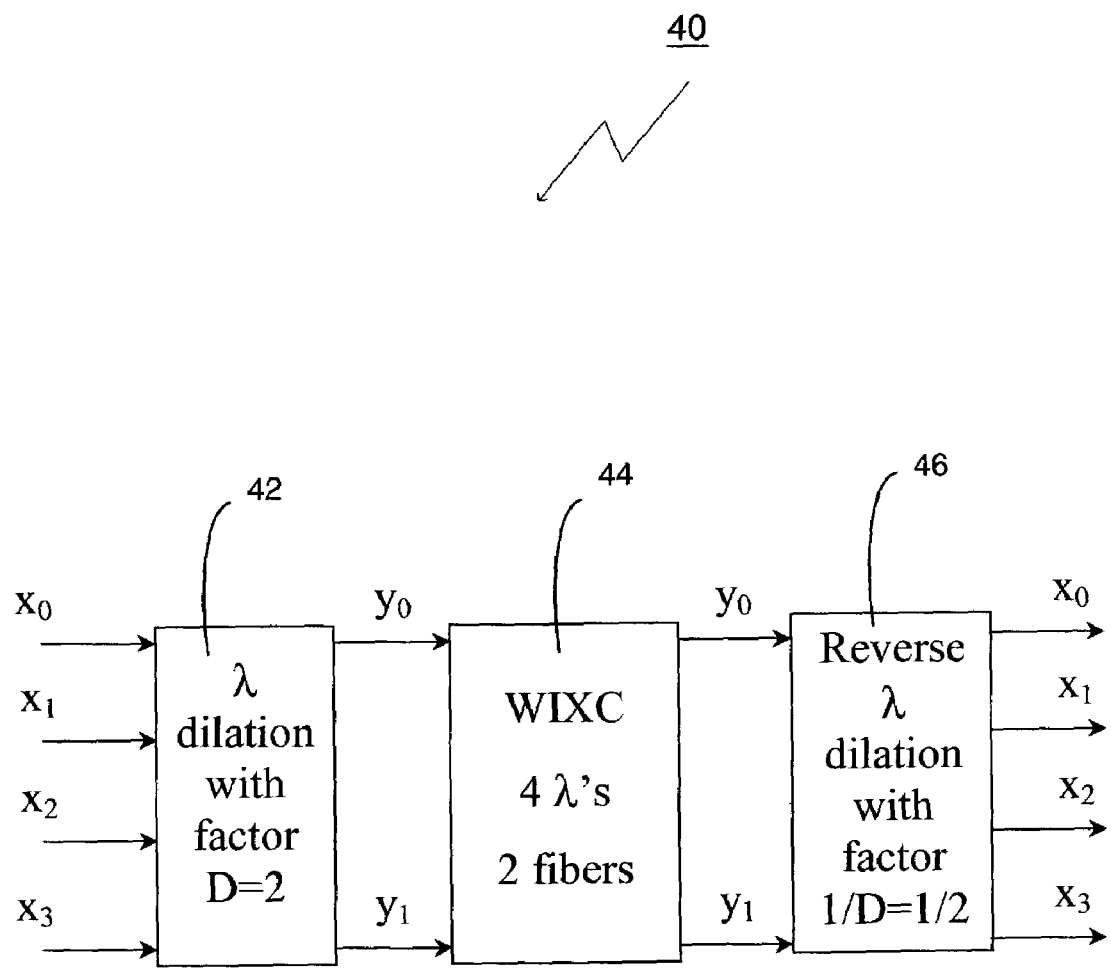
FIG. 4 shows an example of a wavelength-dilated optical cross-connect in accordance with the present invention.

Referring to FIG. 4, there is shown an example of a wavelength-dilated optical cross-connect 40 comprising an input wavelength-dilation module 42, a central wavelength-interchanging cross-connect 44, and an output reverse wavelength-dilation module 46. The wavelength-dilated optical cross-connect 40 has four input fibers, $x_n$, and four output fibers, $x_n$, each having two wavelengths per fiber. The wavelength-dilated optical cross-connect 40 is formed through wavelength-dilation of an optical cross-connect having two input fibers, $y_n$, and two output fibers, $y_n$, each having four wavelengths per fiber. The dilation and reverse dilation factors are respectively 2 and ½.

Figure 5:
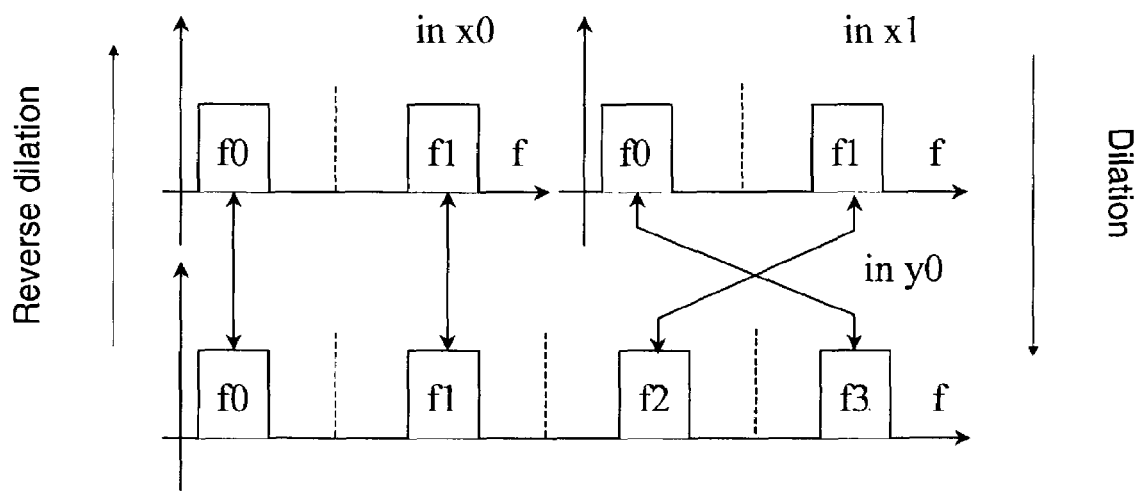
FIG. 5 shows how channels from fibers $x_0$ and $x_1$ are dilated to channels in fiber $y_0$ in the wavelength-dilated optical cross-connect of FIG. 4.

FIG. 5 shows how channels from fibers $x_0$ and $x_1$ are dilated to channels in fiber $y_0$ in the wavelength-dilated optical cross-connect 40 of FIG. 4. Channels $(f_0, x_0)$ and $(f_1, x_0)$ are respectively mapped to channels $(f_0, y_0)$ and $(f_1, y_0)$, while channels $(f_0, x_1)$ and $(f_1, x_1)$ are respectively mapped to channels $(f_3, y_0)$ and $(f_2, y_0)$.

Figure 6:
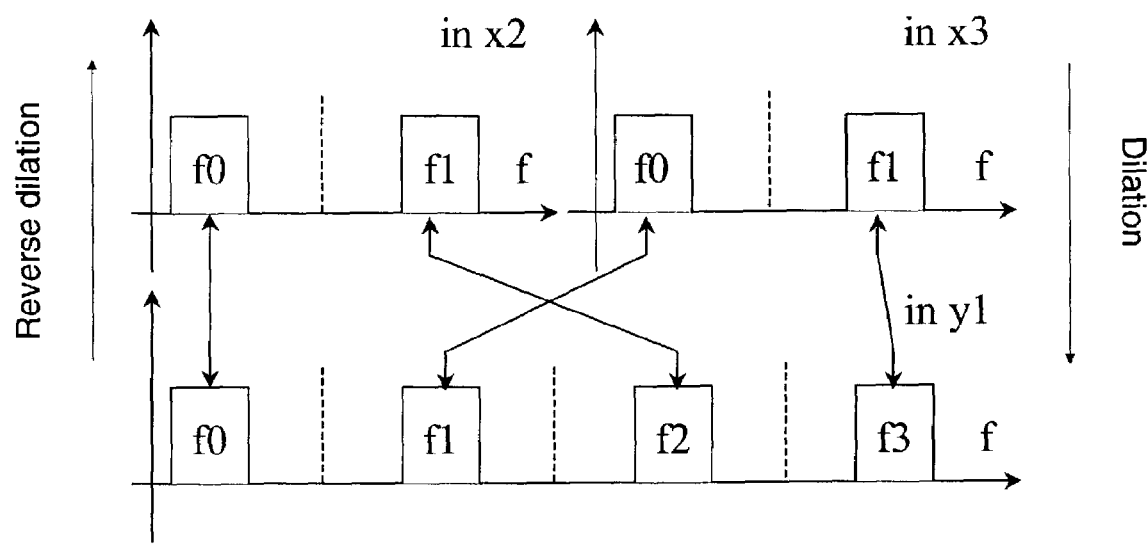
FIG. 6 shows how channels from fibers $x_2$ and $x_3$ are dilated to channels in fiber $y_1$ in the wavelength-dilated optical cross-connect of FIG. 4.

FIG. 6 shows how channels from fibers $x_2$ and $x_3$ are dilated to channels in fiber $y_1$ in the wavelength-dilated optical cross-connect 40 of FIG. 4. Channels $(f_0, x_2)$ and $(f_1, x_2)$ are respectively mapped to channels $(f_0, y_1)$ and $(f_2, y_1)$, while channels $(f_0, x_3)$ and $(f_1, x_3)$ are respectively mapped to channels $(f_1, y_1)$ and $(f_3, y_1)$.

Both in FIG. 5 and in FIG. 6, channels from distinct fibers are moved to disjoint frequency sets in the dilation, and to common frequency sets in the reverse dilation. During the dilation, channels from the same fiber need not be mapped to contiguous frequencies. Also, it is not required that the ordering of channels with respect to their frequencies be preserved.

A cross-fiber wavelength-dilation operation may map channels from the same fibers in blocks of channels occupying contiguous frequencies, or it may interleave channels from different fibers. From these two basic distributions, it is possible to generate many other wavelength-dilation schemes. For example, block cross-fiber wavelength-dilation is an important variation of cross-fiber wavelength-dilation, where channels from a common fiber are mapped to channels occupying contiguous frequencies on a common space-division. Similarly, reverse block cross-fiber wavelength-dilation is a particular form of reverse cross-fiber wavelength-dilation, where channels occupying contiguous frequencies on a given fiber or space-division may be mapped to a common reverse-dilated space-division.

Figure 7:
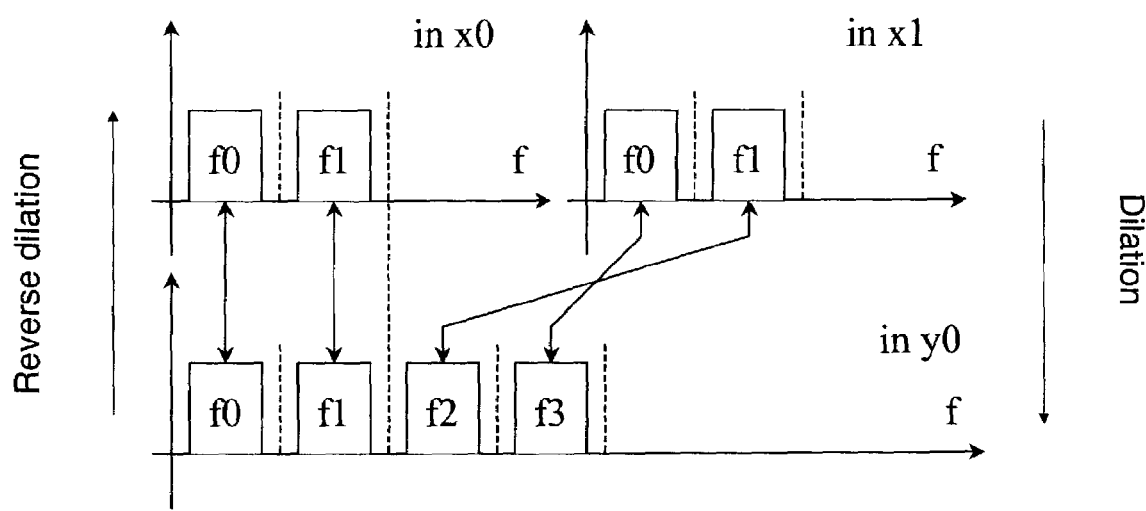
FIG. 7 shows a block mapping of channels from fibers $x_0$ and $x_1$ to channels in fiber $y_0$ in the wavelength-dilated optical cross-connect of FIG. 4.
Figure 8:
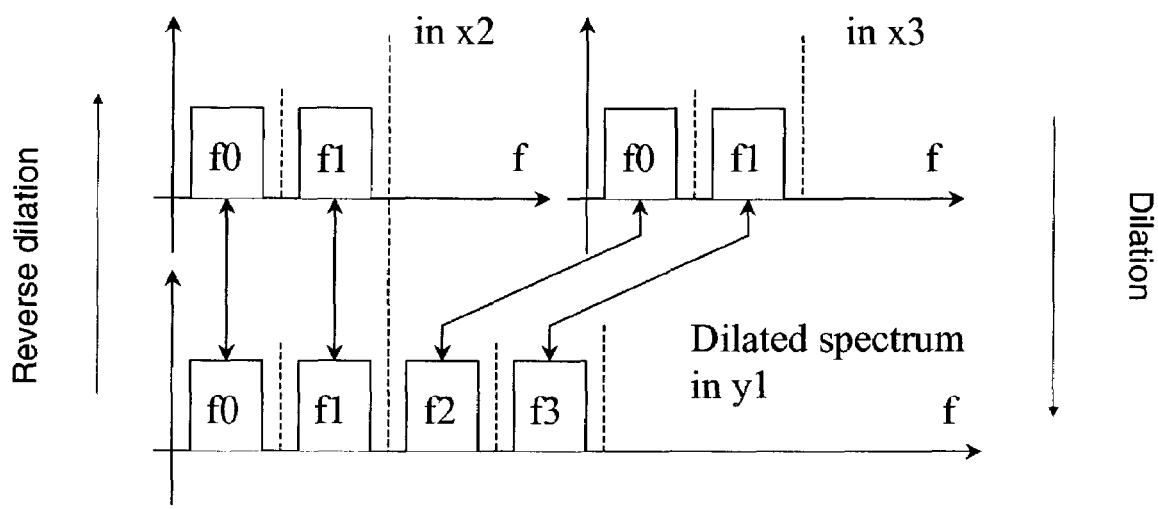
FIG. 8 shows a block mapping of channels from fibers $x_2$ and $x_3$ to channels in fiber $y_1$ in the wavelength-dilated optical cross-connect of FIG. 4.

Referring to FIG. 7 and FIG. 8, there are shown examples of block wavelength-dilation for the wavelength-dilated optical cross-connect 40 of FIG. 4. That is, FIG. 7 shows a block mapping of channels from fibers $x_0$ and $x_1$ to channels in fiber $y_0$ in the wavelength-dilated optical cross-connect 40 of FIG. 4. Channels $(f_0, x_0)$ and $(f_1, x_0)$ are respectively mapped to channels $(f_0, y_0)$ and $(f_1, y_0)$, while channels $(f_0, x_1)$ and $(f_1, x_1)$ are respectively mapped to channels $(f_3, y_0)$ and $(f_2, y_0)$. FIG. 8 shows a block mapping of channels from fibers $x_2$ and $x_3$ to channels in fiber $y_1$ in the wavelength-dilated optical cross-connect 40 of FIG. 4. Channels $(f_0, x_2)$ and $(f_1, x_2)$ are respectively mapped to channels $(f_0, y_1)$ and $(f_1, y_1)$, while channels $(f_0, x_3)$ and $(f_1, x_3)$ are respectively mapped to channels $(f_2, y_1)$ and $(f_3, y_1)$.

Interleaved cross-fiber wavelength-dilation is another important variation of cross-fiber wavelength-dilation, where channels from the same fiber are mapped to a common space-division and are interleaved with dilated channels from other distinct fibers on the same space-division. Similarly, reverse interleaved cross-fiber wavelength-dilation is a form of reverse cross-fiber wavelength-dilation, where two contiguous channels on the same space-division are mapped to distinct reverse-dilated space-divisions.

Figure 9:
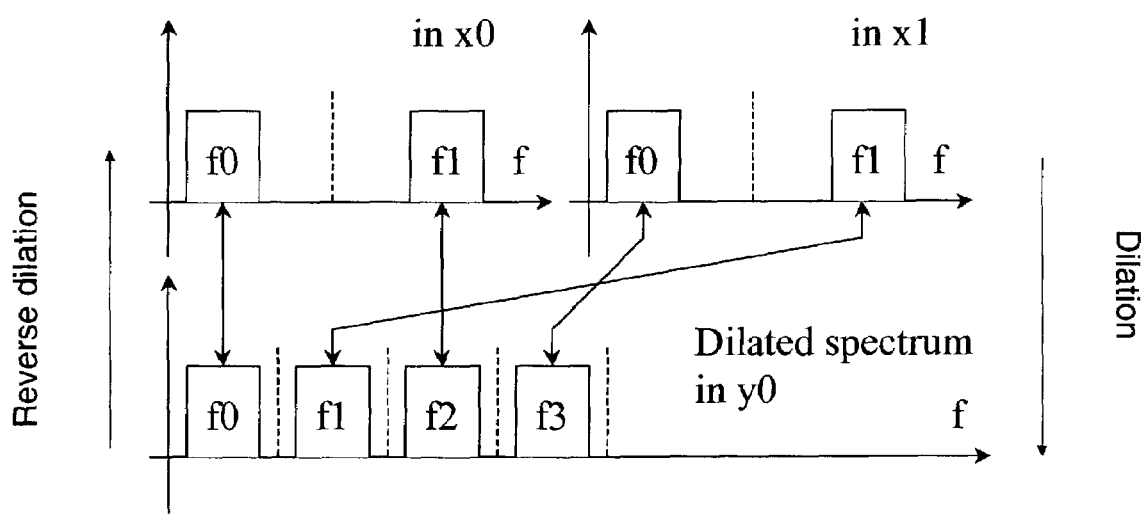
FIG. 9 shows an interleaved mapping of channels from fibers $x_0$ and $x_1$ to channels in fiber $y_0$ in the wavelength-dilated optical cross-connect of FIG. 4.
Figure 10:
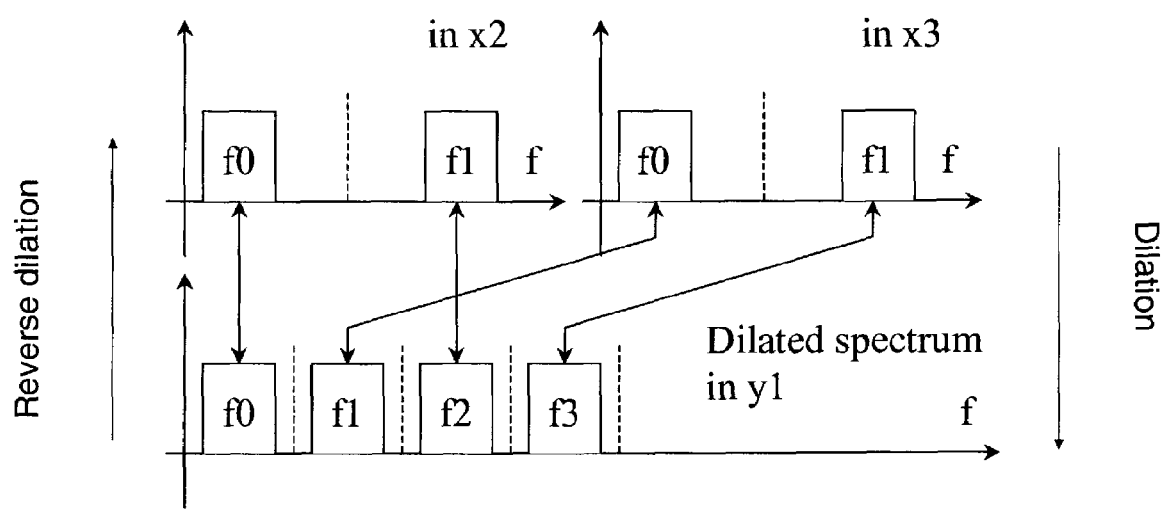
FIG. 10 shows an interleaved mapping of channels from fibers $x_2$ and $x_3$ to channels in fiber $y_1$ in the wavelength-dilated optical cross-connect of FIG. 4.

Referring to FIG. 9 and FIG. 10, there are shown examples of interleaved wavelength-dilation for the wavelength-dilated optical cross-connect 40 of FIG. 4. That is, FIG. 9 shows an interleaved mapping of channels from fibers $x_0$ and $x_1$ to channels in fiber $y_0$ in the wavelength-dilated optical cross-connect 40 of FIG. 4. Channels $(f_0,x_0)$ and $(f_1,x_0)$ are respectively mapped to channels $(f_0,y_0)$ and $(f_2,y_0)$, while channels $(f_0,x_1)$ and $(f_1,x_1)$ are respectively mapped to channels $(f_3,y_0)$ and $(f_1,y_0)$. On $y_0$, images of channels from $x_0$ and $x_1$ are frequency-interleaved. FIG. 10 shows an interleaved mapping of channels from fibers $x_2$ and $x_3$ to channels in fiber $y_1$ in the wavelength-dilated optical cross-connect 40 of FIG. 4. Channels $(f_0,x_2)$ and $(f_1,x_2)$ are respectively mapped to channels $(f_0,y_1)$ and $(f_2,y_1)$, while channels $(f_0,x_3)$ and $(f_1,x_3)$ are respectively mapped to channels $(f_1,y_1)$ and $(f_3,y_1)$.

Cross-fiber wavelength-dilation schemes differ from previous schemes for wavelength-dilation in many aspects. One major difference is the requirement for wavelength conversion. The present invention provides a subset of wavelength-dilation and reverse wavelength-dilation schemes that are implemented with O(1) wave-mixing converters per fiber. That is, wave-mixing cross-fiber wavelength-dilation schemes include cross-fiber wavelength-dilation schemes where a channel at frequency f on a given fiber or space-division is mapped to a channel at frequency $\Delta+\delta.f$ on a dilated space-division, wherein $\delta=\pm1$ and $\Delta$ are constant for all channels from the same space-division. Reverse wave-mixing cross-fiber wavelength-dilation schemes include reverse cross-fiber wavelength-dilation schemes where a channel at frequency f on a given space-division is mapped to a channel at frequency $\Delta+\delta.f$ on a dilated space-division, wherein $\delta=\pm1$ and $\Delta$ are constant for all channels mapped onto the same dilated space-division.

Figure 11:
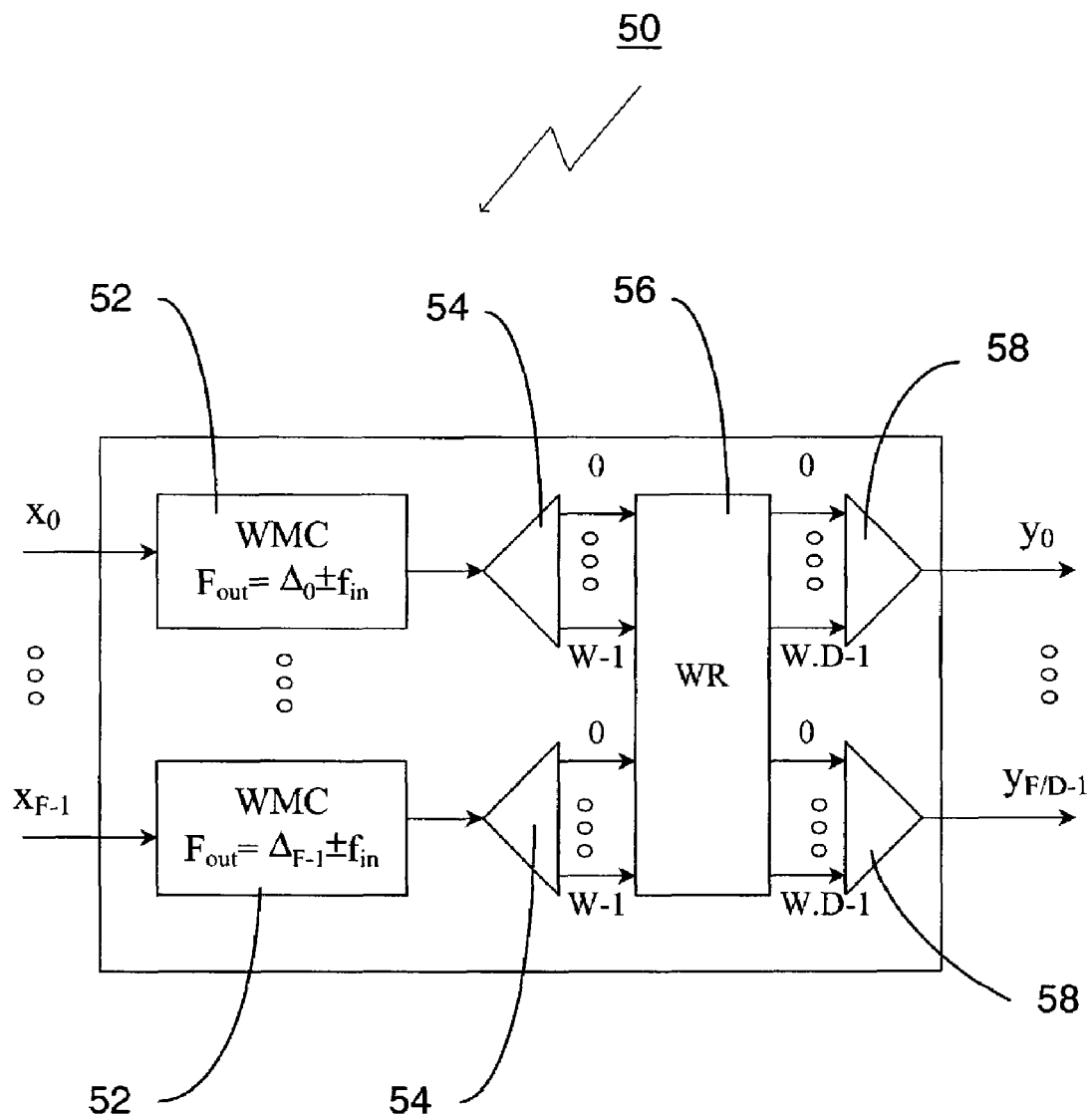
FIG. 11 shows a wave-mixing cross-fiber wavelength-dilation module in accordance with the present invention.

Referring to FIG. 11, there is shown a wave-mixing cross-fiber wavelength-dilation module 50 comprising a plurality of wave-mixing converters 52, a plurality of optical demultiplexers 54, a wavelength router 56, and a plurality of optical multiplexers 58. For each fiber $x_\lambda$, a dedicated one of the plurality of wave-mixing converters 52 provides a bulk frequency conversion of all incoming channels on fiber $x_\lambda$. That is, in the wave-mixing converter 52 that is dedicated to fiber $x_+$, an incoming channel with frequency f is converted to frequency $\Delta_\lambda+\delta_\lambda.f$, wherein $\delta_\lambda=\pm1$ and $\Delta_\lambda$ are constant for all channels on fiber $x_\lambda$. The converted channels are demultiplexed by a dedicated one of the plurality of optical demultiplexers 54 and sent to the wavelength router 56. The wavelength router 56 directs each of the converted channels to a dedicated one of the plurality of optical multiplexers 58. The plurality of optical multiplexers 58 number F/D corresponding to the F/D dilated space-divisions, wherein $D \geq 1$. Each of the plurality of optical multiplexers 58 multiplexes D.W channels at distinct frequencies covering the whole dilated spectrum. It should be noted that the plurality of optical multiplexers 58 may be optional if the central wavelength-interchanging cross-connect 34 of FIG. 3 accepts non-multiplexed channels.

Figure 12:
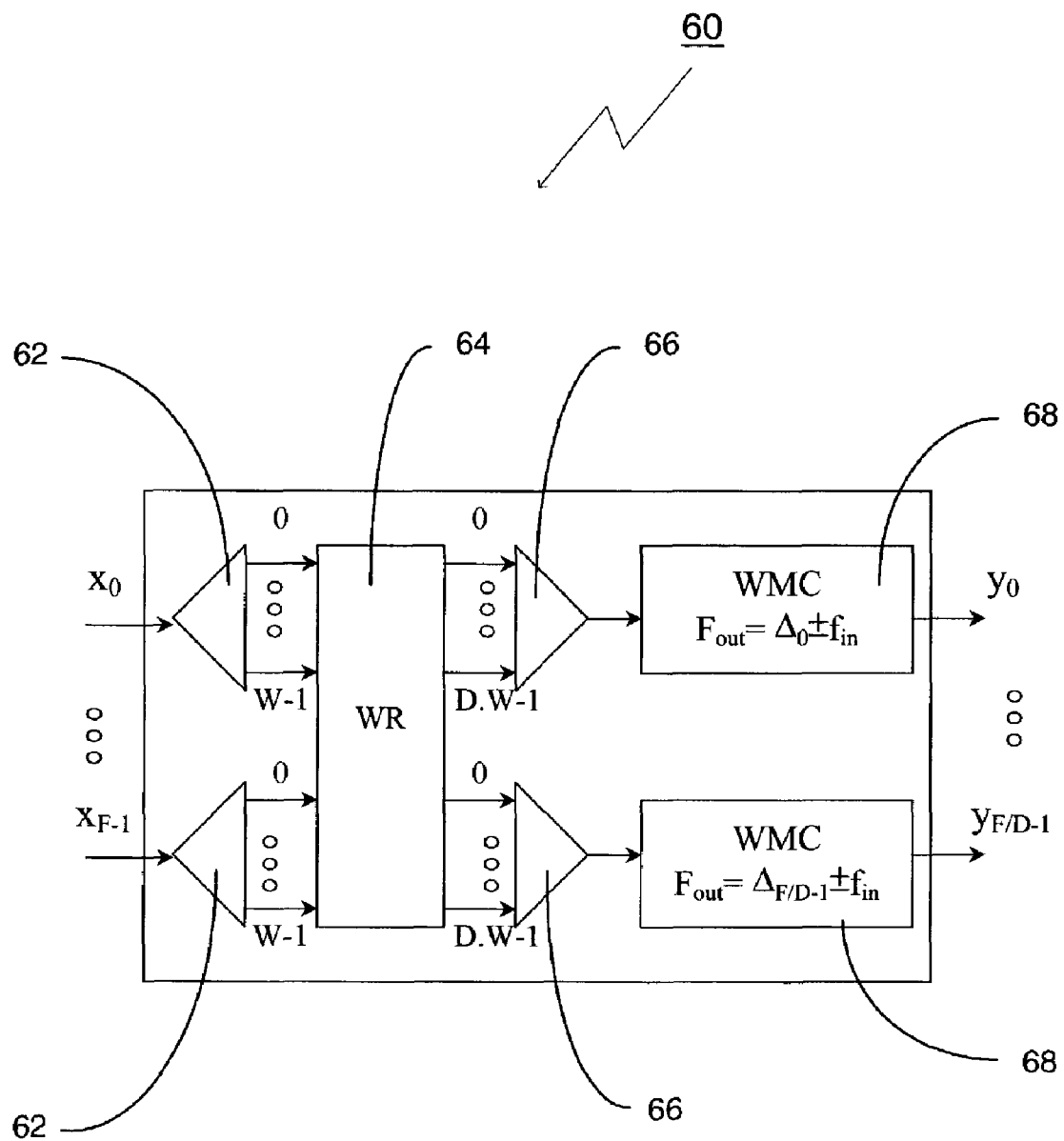
FIG. 12 shows a reverse wave-mixing cross-fiber wavelength-dilation module in accordance with the present invention.

Referring to FIG. 12, there is shown a reverse wave-mixing cross-fiber wavelength-dilation module 60 comprising a plurality of optical demultiplexers 62, a wavelength router 64, a plurality of optical multiplexers 66, and a plurality of wave-mixing converters 68. For each one of F incoming fibers, channels are first demultiplexed by a dedicated one of the plurality of optical demultiplexers 62, switched by the wavelength router 64, and directed to a dedicated one of the plurality of optical multiplexers 66. The plurality of optical multiplexers 66 number F/D corresponding to the F/D dilated space-divisions, wherein D<1. Each of the plurality of optical multiplexers 66 multiplexes D.W channels at distinct frequencies covering the whole dilated spectrum. The output from each of the plurality of optical multiplexers 66 is sent to a dedicated one of the plurality of wave-mixing converters 68. Each of the plurality of wave-mixing converters 68 converts a channel with frequency f that is received from a particular one of the plurality of optical multiplexers 66 into a channel with frequency $\Delta+\delta.f$, wherein $\delta=\pm1$ and $\Delta$ are constant for all channels that are received from the same particular one of the plurality of optical multiplexers 66. For each of the plurality of wave-mixing converters 68, output channels occupy D.W distinct frequencies in one of F/D dilated space-divisions. It should be noted that the plurality of optical demultiplexers 62 may be optional if the central wavelength-interchanging cross-connect 34 of FIG. 3 provides demultiplexed channels.

Figure 13:
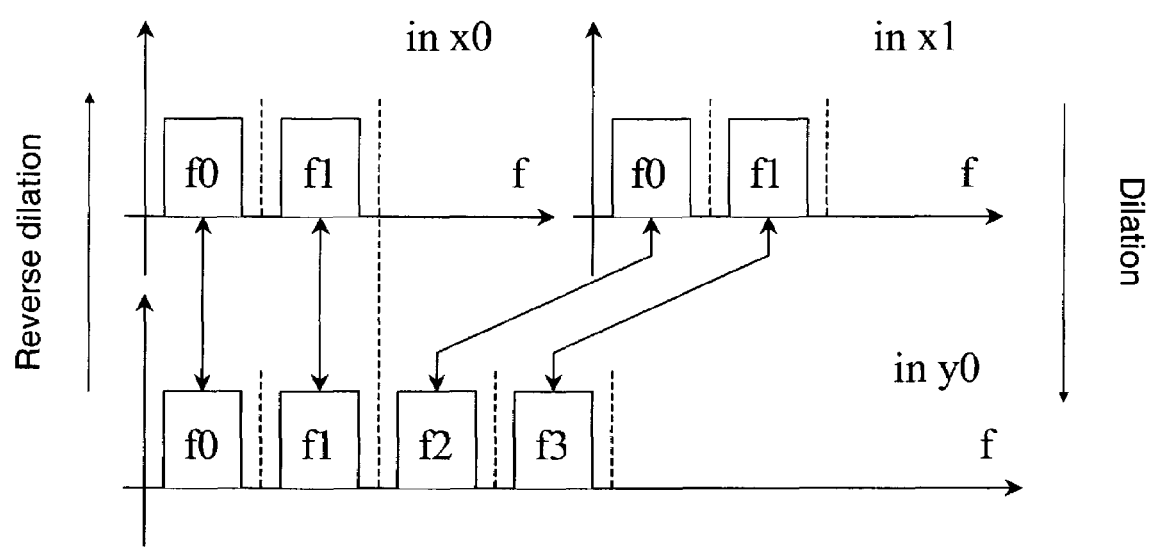
FIG. 13 shows a block mapping of channels from fibers $x_0$ and $x_1$ to channels in fiber $y_0$ in the wavelength-dilated optical cross-connect of FIG. 4 when utilizing the wave-mixing wavelength-dilation module of FIG. 11 and the reverse wave-mixing wavelength-dilation module of FIG. 12.

FIG. 13 shows a block mapping of channels from fibers $x_0$ and $x_1$ to channels in fiber $y_0$ in the wavelength-dilated optical cross-connect 40 of FIG. 4 when utilizing the wave-mixing wavelength-dilation module 50 of FIG. 11 and the reverse wave-mixing wavelength-dilation module 60 of FIG. 12. Channels $(f_0,x_0)$ and $(f_1,x_0)$ are respectively mapped to channels $(f_0=f_0+0.\Delta f, y_0)$ and $(f_1=f_1+0.\Delta f, y_0)$, while channels $(f_0,x_1)$ and $(f_1,x_1)$ are respectively mapped to channels $(f_2=f_0+2\Delta f, y_0)$ and $(f_3=f_1+2\Delta f, y_0)$.

Figure 14:
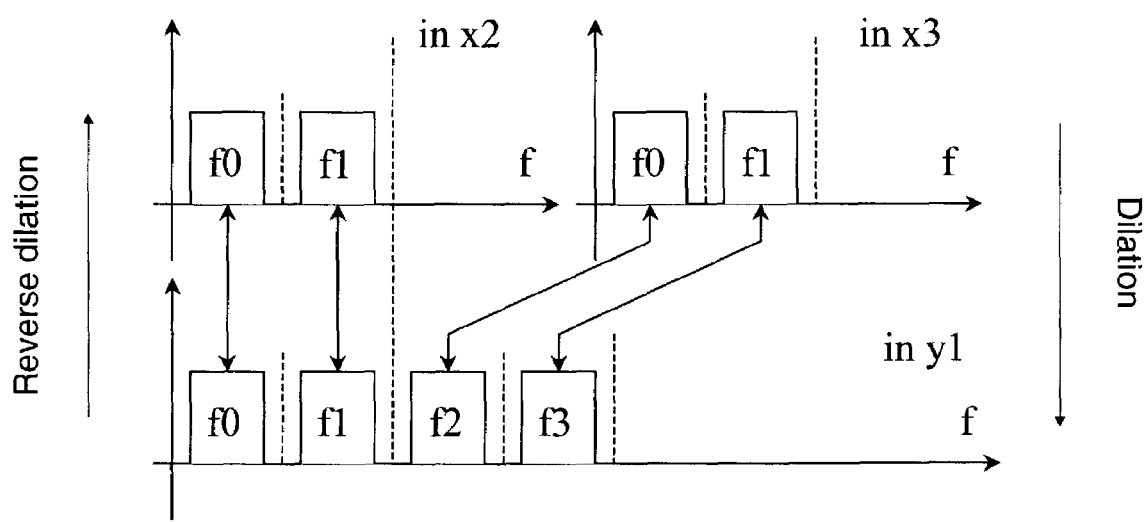
FIG. 14 shows a block mapping of channels from fibers $x_2$ and $x_3$ to channels in fiber $y_1$ in the wavelength-dilated optical cross-connect of FIG. 4 when utilizing the wave-mixing wavelength-dilation module of FIG. 11 and the reverse wave-mixing wavelength-dilation module of FIG. 12.

FIG. 14 shows a block mapping of channels from fibers $x_2$ and $x_3$ to channels in fiber $y_1$ in the wavelength-dilated optical cross-connect 40 of FIG. 4 when utilizing the wave-mixing wavelength-dilation module 50 of FIG. 11 and the reverse wave-mixing wavelength-dilation module 60 of FIG. 12. Channels $(f_0,x_2)$ and $(f_1,x_2)$ are respectively mapped to channels $(f_0=f_0+0.\Delta f, y_1)$ and $(f_1=f_1+0.\Delta f; y_1)$, while channels $(f_0,x_3)$ and $(f_1,x_3)$ are respectively mapped to channels $(f_2=f_0+2.\Delta f, y_1)$ and $(f_3=f_1+2.\Delta f, y_1)$.

Figure 15:
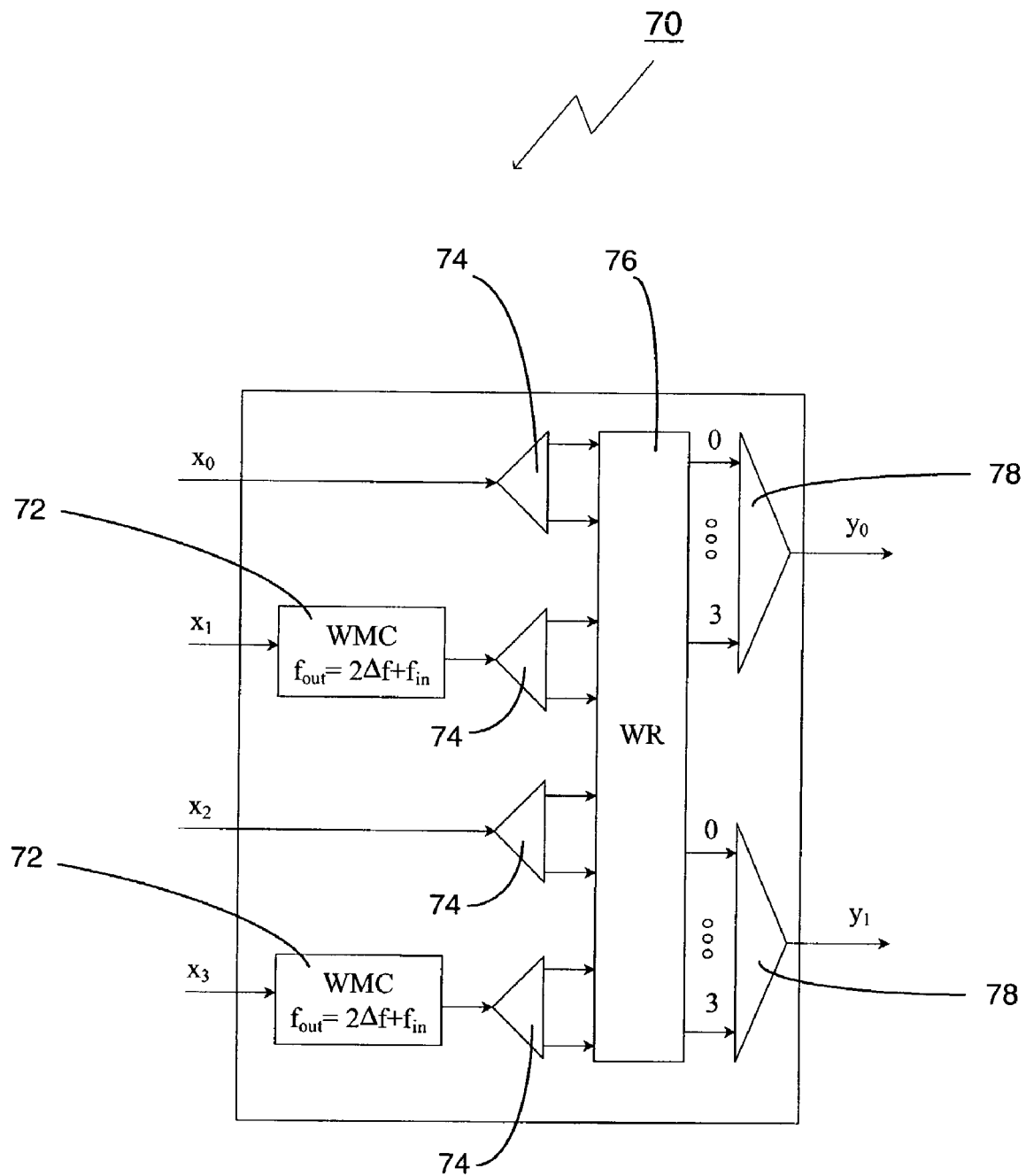
FIG. 15 shows an example of a block wave-mixing wavelength-dilation module in accordance with the present invention.

Referring to FIG. 15, there is shown an example of a block wave-mixing wavelength-dilation module 70 comprising a pair of wave-mixing converters 72, four optical demultiplexers 74, a wavelength router 76, and a pair of optical multiplexers 78. The block wave-mixing wavelength-dilation module 70 has four input fibers, $x_n$, with two wavelengths per fiber, and two output fibers, $y_n$, with four wavelengths per fiber.

Figure 16:
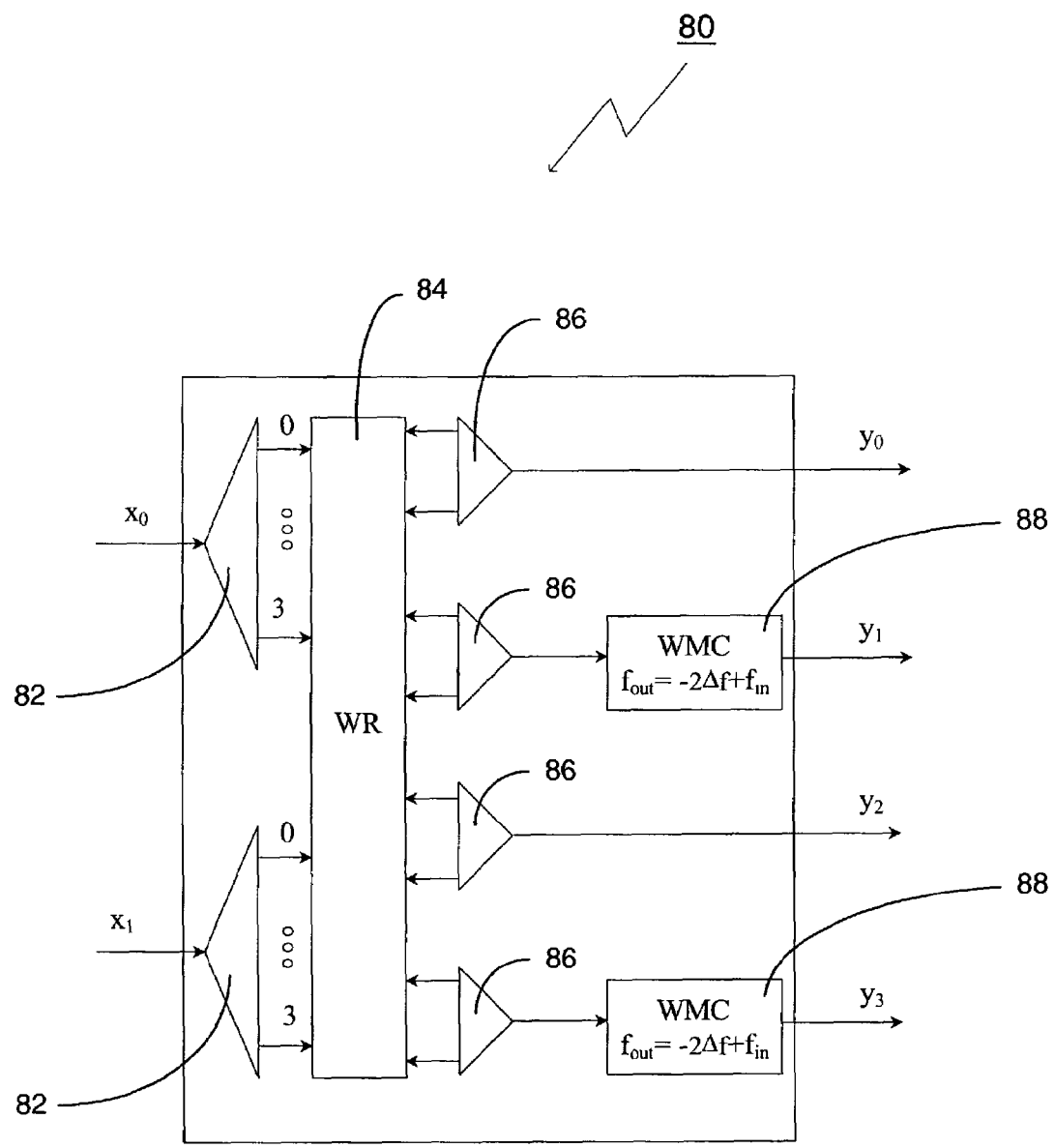
FIG. 16 show an example of a reverse block wave-mixing wavelength-dilation module in accordance with the present invention.

Referring to FIG. 16, there is shown an example of a reverse block wave-mixing wavelength-dilation module 80 comprising a pair optical demultiplexers 82, a wavelength router 84, four optical multiplexers 86, and a pair of wave-mixing converters 88. The reverse block wave-mixing wavelength-dilation module 80 has two input fibers, $x_n$, with four wavelengths per fiber, and four output fibers, $y_n$, with two wavelengths per fiber.

In summary, the present invention provides a new technique for wavelength-dilation based on wavelength conversion. A key feature of the present invention technique is to map channels on distinct fibers, and with frequencies in a common frequency set, to channels on a common space-division with frequencies in disjoint frequency sets. The present invention technique may be varied according to the relative ordering of channels before and after the dilation, and to the type of frequency conversions required by the dilation. Regarding the relative order of channels from distinct fibers, a dilation can be of a block or interleaved type. In block type dilations, channels from the same fiber occupy contiguous frequencies on their common dilated space-division. In interleaved type dilations, channels from the same fiber are frequency-interleaved with channels from other distinct fibers. Regarding the type of frequency conversion required by a cross-fiber wavelength-dilation, the present invention technique provides special schemes based on wave-mixing, where a channel with frequency f on a given fiber is mapped to a channel with frequency $\Delta+\delta.f$, wherein $\delta=\pm 1$ and $\Delta$ are constant for channels from the same fiber, or mapped to a common dilated space-division. Wave-mixing cross-fiber wavelength-dilations are of particular interest since these may be implemented with O(1) wave-mixing converters per fiber. Cross-fiber wavelength-dilation has applications to reduce converter requirements in wavelength-interchanging cross-connects.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for dilating optical channels in a system having W optical frequencies, the method comprising the steps of:
    receiving a plurality of optical channels each operating at a respective one of the W optical frequencies;
    converting the optical frequency of each of the plurality of optical channels into a respective converted optical frequency defined by $\Delta+\delta f$, wherein f represents the optical frequency of each of the plurality of optical channels, and wherein $\delta=\pm 1$ and $\Delta$ is a frequency-independent frequency shift value and both are constant for all of the plurality of optical channels; and
    directing each of the plurality of optical channels based at least in part upon the respective converted optical frequency of each of the plurality of optical channels.

2. The method as defined in claim 1, wherein the respective converted optical frequency of each of the plurality of optical channels is one of the W optical frequencies.

3. The method as defined in claim 1, wherein the step of receiving a plurality of optical channels includes the step of:
    receiving a multiplexed optical signal including the plurality of optical channels.

4. The method as defined in claim 3, further comprising the step of:
    demultiplexing the multiplexed optical signal into each of the plurality of optical channels according to the respective converted optical frequency of each of the plurality of optical channels.

5. The method as defined in claim 4, further comprising the step of:
    multiplexing each of the plurality of directed optical channels into a respective multiplexed optical signal having W×D optical channels, wherein $D \geq 1$.

6. The method as defined in claim 5, wherein there is a total of F/D multiplexed optical signals each having W×D optical channels, wherein F represents a number of space-divisions within the system.

7. An apparatus for dilating optical channels in a system having W optical frequencies, the apparatus comprising:
    a converter for receiving a plurality of optical channels each operating at a respective one of the W optical frequencies, and for converting the optical frequency of each of the plurality of optical channels into a respective converted optical frequency defined by $\Delta+\delta f$, wherein f represents the optical frequency of each of the plurality of optical channels, and wherein $\delta=\pm 1$ and $\Delta$ is a frequency-independent frequency shift value and both are constant for all of the plurality of optical channels; and
    a routing device for directing each of the plurality of optical channels based at least in part upon the respective converted optical frequency of each of the plurality of optical channels.

8. The apparatus as defined in claim 7, wherein the converter receives the plurality of optical channels by receiving a multiplexed optical signal including the plurality of optical channels.

9. The apparatus as defined in claim 8, further comprising:
    a demultiplexer for demultiplexing the multiplexed optical signal into each of the plurality of optical channels according to the respective converted optical frequency of each of the plurality of optical channels.

10. The apparatus as defined in claim 9, further comprising:
    a multiplexer for multiplexing each of the plurality of directed optical channels into a respective multiplexed optical signal having W×D optical channels, wherein $D \geq 1$.

11. A method for reverse dilating optical channels in a system having W optical frequencies, the method comprising the steps of:
    receiving a plurality of optical channels each operating at a respective one of the W optical frequencies;
    directing each of the plurality of optical channels based at least in part upon the respective optical frequency of each of the plurality of optical channels; and
    converting the optical frequency of each of the plurality of directed optical channels into a respective converted optical frequency defined by $\Delta+\delta f$, wherein f represents the optical frequency of each of the plurality of directed optical channels, and wherein $\delta=\pm 1$ and $\Delta$ is a frequency-independent frequency shift value and both are constant for all of the plurality of directed optical channels.

12. The method as defined in claim 11, wherein the respective converted optical frequency of each of the plurality of directed optical channels is one of the W optical frequencies.

13. The method as defined in claim 11, wherein the step of receiving a plurality of optical channels includes the step of:
    receiving a multiplexed optical signal including the plurality of optical channels.

14. The method as defined in claim 13, further comprising the step of:

demultiplexing the multiplexed optical signal into each of the plurality of optical channels according to the respective optical frequency of each of the plurality of optical channels.

15. The method as defined in claim 14, further comprising the step of:

multiplexing each of the plurality of directed optical channels into a respective multiplexed optical signal having W×D optical channels, wherein D<1.

16. The method as defined in claim 15, wherein there is a total of F/D multiplexed optical signals each having W×D optical channels, wherein F represents a number of space-divisions within the system.

17. An apparatus for reverse dilating optical channels in a system having W optical frequencies, the apparatus comprising:

a routing device for receiving a plurality of optical channels each operating at a respective one of the W optical frequencies, and for directing each of the plurality of optical channels based at least in part upon the respective optical frequency of each of the plurality of optical channels; and a converter for converting the optical frequency of each of the plurality of directed optical channels into a respective converted optical frequency defined by $\Delta+\delta f$, wherein f represents the optical frequency of each of the plurality of directed optical channels, and wherein $\delta=\pm 1$ and $\Delta$ is a frequency-independent frequency shift value and both are constant for all of the plurality of directed optical channels.

18. The apparatus as defined in claim 17, wherein the routing device receives the plurality of optical channels by receiving a multiplexed optical signal including the plurality of optical channels.

19. The apparatus as defined in claim 18, further comprising:

a demultiplexer for demultiplexing the multiplexed optical signal into each of the plurality of optical channels according to the respective optical frequency of each of the plurality of optical channels.

20. The apparatus as defined in claim 19, further comprising:

a multiplexer for multiplexing each of the plurality of directed optical channels into a respective multiplexed optical signal having W×D optical channels, wherein D<1.

* * * * *